US012741710B2

(12) United States Patent
Zhu et al.

(10) Patent No.: US 12,741,710 B2
(45) Date of Patent: Sep. 22, 2026

(54) WHOLE-BODY COMPLIANCE CONTROL METHOD APPLIED TO FAST WALKING BIPED ROBOT

(71) Applicant: ZHEJIANG LAB, Hangzhou (CN)

(72) Inventors: Yiting Zhu, Hangzhou (CN); Dingkun Liang, Hangzhou (CN); Ye Xie, Hangzhou (CN); Chengzhi Gao, Hangzhou (CN); Anhuan Xie, Hangzhou (CN); Jianjun Gu, Hangzhou (CN); Shiqiang Zhu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 158 days.

(21) Appl. No.: 18/686,845

(22) PCT Filed: Oct. 17, 2023

(86) PCT No.: PCT/CN2023/125001
§ 371 (c)(1),
(2) Date: Feb. 26, 2024

(87) PCT Pub. No.: WO2024/146206
PCT Pub. Date: Jul. 11, 2024

(65) Prior Publication Data
US 2025/0128774 A1 Apr. 24, 2025

(30) Foreign Application Priority Data
Jan. 4, 2023 (CN) ......................... 202310009303.9

(51) Int. Cl.
*B62D 57/032* (2006.01)
*B25J 9/16* (2006.01)
(Continued)

(52) U.S. Cl.
CPC .......... *B62D 57/032* (2013.01); *B25J 9/1641* (2013.01); *B25J 13/085* (2013.01); *B25J 19/0004* (2013.01)

(58) Field of Classification Search
CPC ..... B62D 57/032; B25J 9/1641; B25J 13/085; B25J 19/0004; G05D 1/49; Y02T 90/00
See application file for complete search history.

(56) References Cited

U.S. PATENT DOCUMENTS

| | | | | |
|---|---|---|---|---|
| 2021/0009218 | A1* | 1/2021 | Huang | B62D 57/02 |
| 2022/0314467 | A1* | 10/2022 | Obana | B62D 57/032 |

(Continued)

FOREIGN PATENT DOCUMENTS

| | | |
|---|---|---|
| CN | 104298243 | 1/2015 |
| CN | 110244791 | 9/2019 |

(Continued)

OTHER PUBLICATIONS

C. Zhou, Z. Li, J. Castano, H. Dallali, N. G. Tsagarakis and D. G. Caldwell, "A passivity based compliance stabilizer for humanoid robots," 2014 IEEE International Conference on Robotics and Automation (ICRA), Hong Kong, China, 2014, pp. 1487-1492, doi: 10.1109/ICRA.2014.6907048. (Year: 2014).*

(Continued)

*Primary Examiner* — Adam R Mott
*Assistant Examiner* — Ricardo I Viscarra
(74) *Attorney, Agent, or Firm* — Jiwen Chen; Joywin IP Law PLLC

(57) ABSTRACT

The present invention provides a whole-body compliance control method applied to a fast and stable walking biped robot, and the control method includes: obtaining a plantar stress and a plantar moment based on information of a foot force sensor to estimate an actual ZMP position of the robot; designing a centroid compliance controller based on the
(Continued)

actual ZMP position of the robot to correct a centroid acceleration; designing a plantar position compliance controller based on a double spring-damper model according to the plantar stress to correct a foot height; designing a plantar posture compliance controller based on the plantar moment to correct a plantar posture; adding corrected centroid and foot values into an originally desired trajectory; and obtaining motor angles of various joints. In the method, the plantar position compliance controller is used to reduce the landing impact; the plantar posture compliance controller is used to ensure that the robot lands flat to prevent the robot from rollover; the centroid compliance controller is used to adjust a centroid position to prevent a robot body from bending forward and backward when the robot walks fast, thereby increasing the stability of the biped robot during fast walking.

2 Claims, 3 Drawing Sheets

(51) Int. Cl.
*B25J 13/08* (2006.01)
*B25J 19/00* (2006.01)

(56) References Cited

U.S. PATENT DOCUMENTS

2023/0191604 A1* 6/2023 Ge .......................... B25J 9/1664 700/253
2023/0234655 A1* 7/2023 Ge .......................... G05D 1/0212 700/245

FOREIGN PATENT DOCUMENTS

| | | |
|---|---|---|
| CN | 111252162 | 6/2020 |
| CN | 113359791 | 9/2021 |
| CN | 114625129 | 6/2022 |

OTHER PUBLICATIONS

Xu Wei, “Research on biped walking balance control algorithm of humanoid robot”, Publication Information of Master’s Electronic Journals: 07 (2011); pp. 30-31, 34-36.
Wang Liyang, “Research on self-learning control method for biped robot based on energy efficiency optimization”, Publication Information of Doctor’s Electronic Journals: Dec. 15, 2014; pp. 17-19.
Wang Yabo, “Gait planning and control of biped humanoid robot”, Publication Information of Master’s Electronic Journals, Jan. 15, 2020, pp. 31-32.

* cited by examiner

WHOLE-BODY COMPLIANCE CONTROL METHOD APPLIED TO FAST WALKING BIPED ROBOT

This is a U.S. national stage application of PCT Application No. PCT/CN2023/125001 under 35 U.S.C. 371, filed Oct. 17, 2023 in Chinese, claiming priority of Chinese Application No. 202310009303.9, Jan. 4, 2023, all of which are hereby incorporated by reference.

FIELD OF TECHNOLOGY

The present invention pertains to the technical field of robots, and in particular relates to a whole-body compliance control method applied to a fast walking biped robot.

BACKGROUND TECHNOLOGY

Biped robot, as one of the important research orientations in the fields of robotics, has become an important symbol of the development level of national frontier technologies because of its interdisciplinary characteristics. The biped robot is likely to encounter interference from external forces or uneven ground when fast walking. Thus, in order to prevent the robot from rollover, in addition to a gait planning algorithm, it is also important to design a control strategy of stability and robustness to external interference.

Zero moment point (ZMP) is a very important concept in the field of biped robots. ZMP refers to the action point on the foot sole of the robot, where the equivalent resultant force of the foot sole passes through the action point, and the foot sole moment at the action point is zero. An important criterion for judging the stability of the biped robot is that ZMP must always be in a support polygon area. A support polygon is the smallest polygon area surrounded by all contact points between the robot foot sole and the ground. When the heel or toe of the robot lands, the support polygon area becomes smaller, that is, the stability area of the robot becomes smaller. Thus, the robot foot sole is kept in smooth contact with the ground, such that ZMP in the support polygon is the basis of stable walking of the biped robot in the support polygon. In addition, keeping the stability of the upper body of the biped robot is also very important for its stable walking. As the walking speed of the robot increases, the centroid movement speed is relatively high with the large tracking error, which leads to reduction in the support polygon area. In this case, the robot is prone to leaning forward and backward when walking, which seriously affects the walking balance of the robot. Therefore, the centroid position is adjusted to effectively track a desired centroid position and accordingly adjust the ZMP position not to exceed the support polygon, which can enhance the walking stability of the robot. In addition, in the walking process, the robot may be unstable because of the excessive impact caused by the early/late landing of the robot or the uneven ground. Meanwhile, if the foot sole does not land flat when the robot lands, a rotating moment will exist when the foot sole is attached to the ground, which will also easily lead to the rollover of the foot sole, causing the robot to fall.

Therefore, it is very important to control the deviation of the centroid position, reduce the landing impact of the robot and ensure the compliance of the plantar posture for the fast and stable walking biped robot.

Patent literature CN202111461183.3 proposes a biped robot balance controller based on fast ankle adjustment, but the controller only controls the ankle position without comprehensively controlling the ankle position and posture.

Moreover, when the robot is in a state of high-speed movement, it is difficult for the actual centroid position of the robot to track the desired position; in this case, only controlling the ankle cannot guarantee the stable walking of the robot.

Patent literature CN202210533708.8 proposes a method for controlling high-dynamic motion centroid compliance of a humanoid robot, but the method does not consider the influence of the excessive impact of foot on stable walking when the robot is on the uneven ground or land early/late due to external interference. In addition, the method does not ensure that the foot can land flat. In this case, the plantar rollover may occur due to the existence of plantar rotating moment, which may lead to the instability of the robot.

SUMMARY OF THE INVENTION

In order to solve problems in the above background, the object of the present invention is to provide a whole-body compliance control method applied to a fast and steady walking biped robot to control stable walking of the biped robot.

In order to achieve the object of the present invention, a whole-body compliance control method applied to a fast and stable walking biped robot provided in an embodiment includes the following steps:

Step 1: acquiring plantar stress data according to information of a foot force sensor, where the plantar stress data includes a plantar stress and a plantar moment;

Step 2: calculating an actual zero moment point (ZMP) position of the robot according to the plantar stress data;

Step 3: using a centroid compliance controller to calculate a centroid acceleration adjustment variable according to a difference between the actual ZMP position and a desired ZMP position; and integrating the centroid acceleration adjustment variable to obtain a centroid position adjustment variable;

Step 4: using a double spring-damper model to establish a state equation of a plantar force and a plantar position according to the plantar stress data; and adjusting spring and damper coefficients to calculate a plantar position adjustment variable of the robot in different landing periods in a vertical direction;

Step 5: using a plantar posture compliance controller to calculate a plantar posture adjustment variable according to a difference between the plantar moment and a desired plantar moment, where the plantar posture includes a rolling direction posture and a pitching direction posture; and Step 6: respectively superimposing the adjustment variables of the centroid position, plantar position and plantar posture to the originally desired centroid position, plantar position and plantar posture; and obtaining angle information of various joints adjusted through an inverse kinematics solution to drive the robot to walk forward.

Preferably, sensor information is collected by a moment sensor array or a force sensor array that is uniformly distributed on a foot sole.

Preferably, in Step 2, according to the plantar stress data, the actual ZMP positions of the robot in x and y directions are calculated through the following formula:

$$p_x = \frac{\sum_{j=1}^{N}\{-\tau_{jy} - (p_{jz} - p_z)f_{jx} + p_{jx}f_{jz}\}}{\sum_{j=1}^{N} f_{jz}}$$

$$p_y = \frac{\sum_{j=1}^{N}\{\tau_{jx} - (p_{jz} - p_z)f_{jy} + p_{jy}f_{jz}\}}{\sum_{j=1}^{N} f_{jz}}$$

Wherein $f_{ji}$ and $\tau_{ji}$ respectively denote a measured force and moment of a j (th) sensor in the i direction, $p_{ji}$ denotes a position coordinate of the sensor relative to an origin of a coordinate system, j=1, . . . , N,i=x,y,z, and the origin of a coordinate system is set as a projective spot of an ankle located on the foot sole.

Preferably, in the Step 3, the biped robot is simplified as a table-cart model to design the centroid compliance controller, where a table height is corresponding to a centroid height relative to the ground; a cart acceleration is a robot centroid acceleration, and the centroid compliance controller is used to calculate the centroid position adjustment variable; and such calculation includes:

firstly, calculating the centroid acceleration adjustment variable:

$$\Delta\ddot{x} = -k_1\Delta p - k_2\Delta x - k_3\Delta\dot{x}$$

wherein $\Delta p$ denotes the difference between the desired ZMP position of the robot and the actual ZMP position thereof, $\Delta x$, $\Delta\dot{x}$ and $\Delta\ddot{x}$ respectively denote cart position, velocity and acceleration adjustment variables; $k_1$, $k_2$ and $k_3$ are determined by coefficient matrices $$\begin{bmatrix} -1/T & 1/T & 0 \\ 0 & 0 & 1 \\ 0 & 0 & 0 \end{bmatrix} \text{ and } \begin{bmatrix} -\frac{z_c}{gT} \\ 0 \\ 1 \end{bmatrix},$$

and weight matrices Q and R of a state variable and a control variable, T denotes a sampling period of a sensor, $z_c$ denotes a table height to ground, and g denotes a gravity acceleration;

secondly, performing twice numerical integration on $\Delta\ddot{x}$ to obtain the centroid position adjustment variable;

Preferably, a linear quadratic regulator is used to calculate coefficients $k_1$, $k_2$ and $k_3$.

Preferably, in Step 4, the double spring-damper model is expressed as:

$$(k_{s1} + k_{s2})f_z + (d_1 + d_2)\dot{f}_z = k_{s1}k_{s2}z_a + (k_{s1}d_2 + k_{s2}d_1)\dot{z}_a$$

wherein $f_z$ denotes an ankle stress in the z axis, $z_a$ denotes an ankle position in the z direction, and $k_{s1}$, $k_{s2}$ and $d_1$, $d_2$ respectively denote rigidity coefficients and damping coefficients of two spring-damper units;

the double spring-damper model is transformed into the form of the state equation, and the linear quadratic regulator is used to calculate the acceleration adjustment variable of the foot sole in a vertical direction:

$$\Delta\ddot{z}_a = -k_{z1}\Delta f_z - k_{z2}\Delta z_a - k_{z3}\Delta\dot{z}_a$$

wherein $\Delta f_z$ denotes a difference between a desired stress value of the ankle and an actual stress value thereof along the z axis, $\Delta z_a$, $\Delta\dot{z}_a$ and $\Delta\ddot{z}_a$ respectively denote the position, velocity and acceleration adjustment variables of the ankle in the z direction, $k_{z1}$, $k_{z2}$ and $k_{z3}$ are determined by coefficient matrices $$\begin{bmatrix} -\frac{k_{s1}+k_{s2}}{d_1+d_2} & \frac{k_{s1}k_{s2}}{d_1+d_2} & \frac{k_{s1}d_2+k_{s2}d_1}{d_1+d_2} \\ 0 & 0 & 1 \\ 0 & 0 & 0 \end{bmatrix} \text{ and } \begin{bmatrix} \frac{d_1d_2}{d_1+d_2} \\ 0 \\ 1 \end{bmatrix},$$

and weight matrices Q and R of a state variable and a control variable, and $k_{s1}$, $k_{s2}$ and $d_1$, $d_2$ respectively denote rigidity coefficients and damping coefficients of the two spring-damper units.

Preferably, the rigidity coefficients and damping coefficients of the two spring-damper units are selected according to different characteristics of the foot sole of the robot in different periods; when the foot sole just lands, relationships between the rigidity coefficients and damping coefficients of the two spring-damper units need to be opposite, that is, one of the spring-damper units has a large rigidity coefficient and a small damping coefficient, and the other thereof has a small rigidity coefficient and a large damping coefficient; during foot support, the two spring-damper units have a same effect and a same relationship between the rigidity coefficient and the damping coefficient.

Preferably, a linear quadratic regulator is used to calculate coefficients $k_{z1}$, $k_{z2}$ and $k_{z3}$.

Preferably, in the Step 5, the plantar posture adjustment variable is calculated by the plantar posture compliance controller according to the following formula:

$$k_d\dot{\delta} + k_p\delta = \tau^d - \tau$$

wherein $\tau$ and $\tau^d$ respectively denote the plantar moment and the desired plantar moment; $\delta$ denotes the plantar posture to be adjusted, wherein the plantar posture includes the rolling direction posture and the pitching direction posture; and $k_P$ and $k_d$ denote gain parameters to be adjusted.

Preferably, in Step 6, the originally desired centroid position, plantar position and plantar posture are generated by a three-dimensional linear inverted pendulum model.

Compared with the prior art, the present invention has at least the following beneficial effects:

(1) according to the present invention, a compliance control mode for adjusting the centroid acceleration is established through the ZMP position; the adjustment time is greatly reduced through acceleration adjustment; and the coefficient adjustment time is reduced by the linear quadratic regulator; and (2) according to the present invention, a mode of plantar position compliance control and plantar posture compliance control that are based on the double spring-damper model is established, such that the robot can track the desired foot position and posture. The parameters of the double spring-damper model are adjusted, such that the robot exhibits different compliance effects in different periods, thereby reducing the impact generated when the robot just lands and ensuring full contact between the foot sole and the ground during the foot support. Meanwhile, the plantar posture compliance control ensures that the foot smoothly lands.

BRIEF DESCRIPTION OF THE DRAWINGS

In order to explain the embodiments of the present invention or the technical solutions in the prior art more clearly, the following will briefly describe the accompanying drawings that need to be used either the embodiments or the prior art. Apparently, the accompanying drawings in the following descriptions are merely some embodiments of the present invention, and persons of ordinary skill in the art may obtain other accompanying drawings according to these accompanying drawings without creative efforts.

DESCRIPTION OF THE EMBODIMENTS

In order to make the object, technical solution and advantages of the present invention more clearly, the present invention will be further described in detail with reference to the accompanying drawings and embodiments. It should be understood that the specific embodiments described herein are merely for explaining the present invention, and do not limit the protection scope of the present invention.

Figure 1:
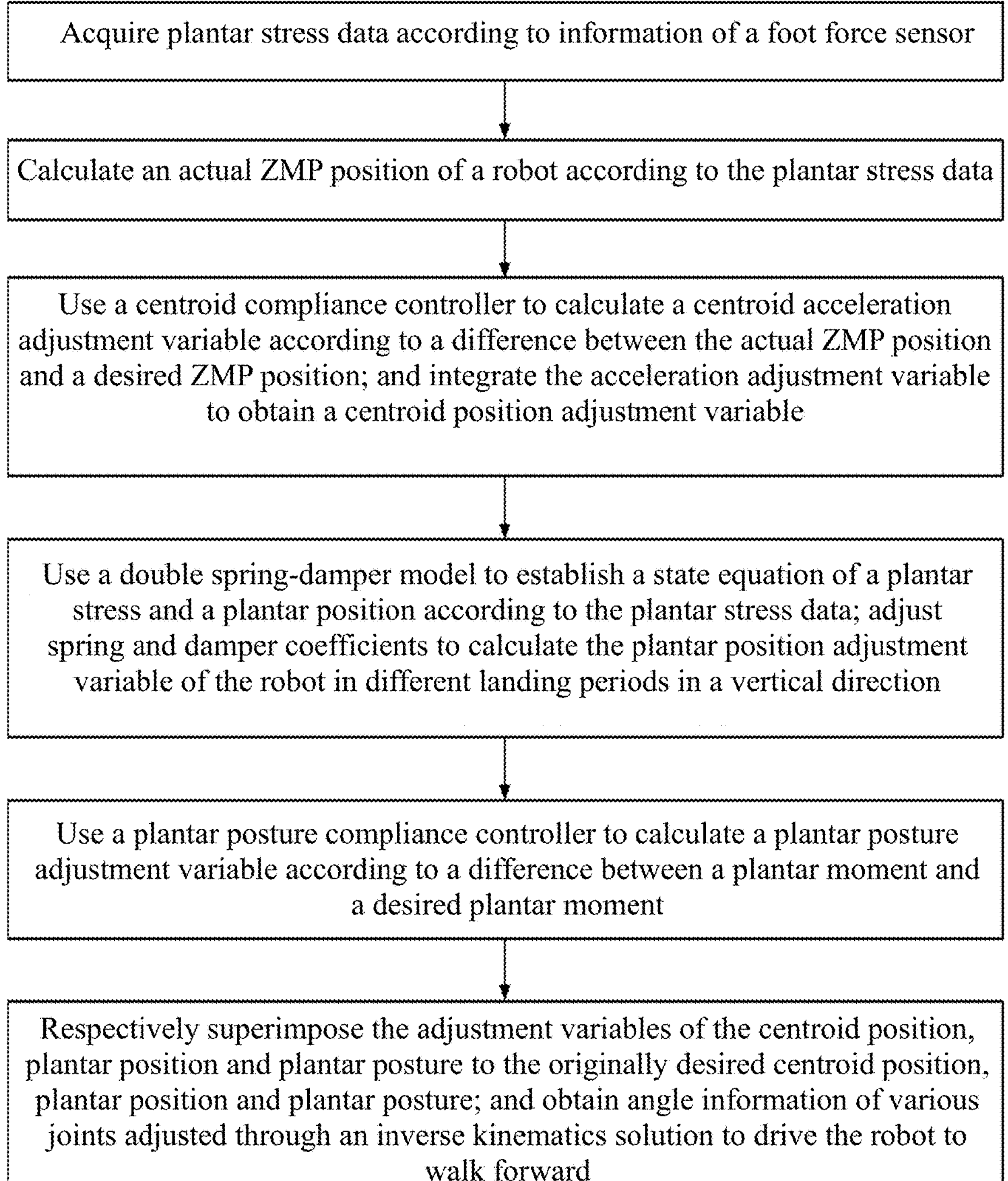
FIG. 1 is a flowchart of a whole-body compliance control method applied to a fast walking biped robot provided in an embodiment of the present invention.
Figure 2:
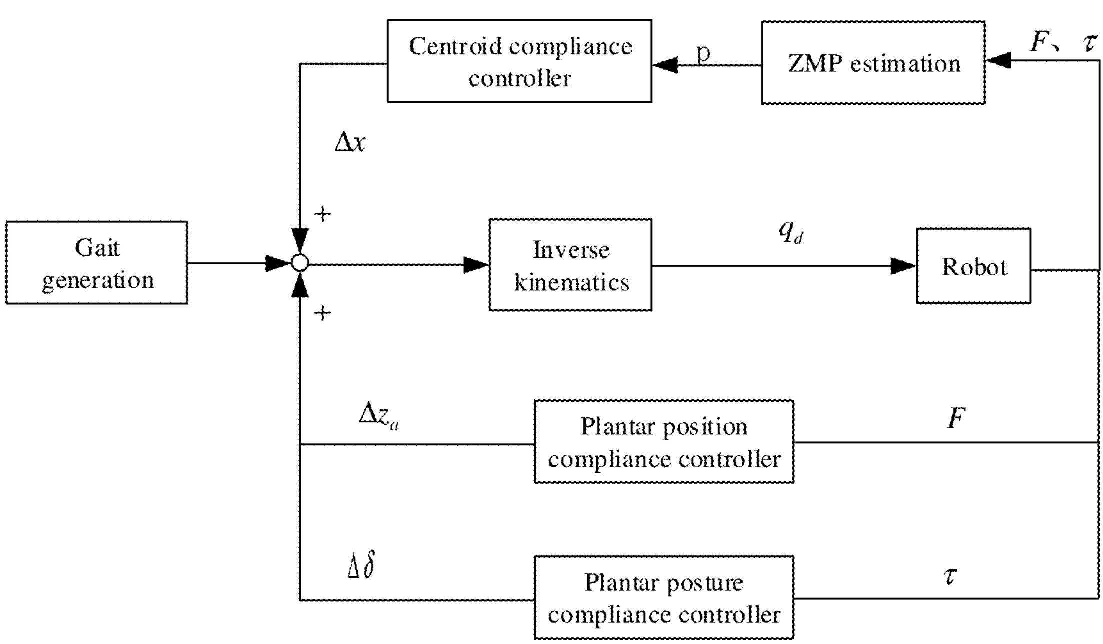
FIG. 2 is a flow block diagram of a whole-body compliance control method applied to a fast walking biped robot provided in an embodiment of the present invention.

As shown in FIG. 1 and FIG. 2, a whole-body compliance control method applied to a fast and stable walking biped robot provided in an embodiment includes the following steps:

Step 1: acquiring plantar stress data according to information of a foot force sensor.

In the embodiment, four six-dimensional force/moment sensors are provided for each foot sole of the robot and respectively distributed at four corners of the foot sole; plantar stress data is obtained according to information of the foot force sensor, where the plantar stress data includes a plantar stress and a plantar moment. The forces measured by the four moment sensors are accumulated to obtain the plantar stress, and the plantar moment at the desired ZMP position is calculated by the distance between the desired ZMP position and the four moment sensors and the plantar stress.

Step 2: calculating an actual zero moment point (ZMP) position of the robot according to the plantar stress data.

It is assumed that $f_{ji}$(j=1, . . . , N,i=x,y,z) and $\tau_{ji}$(j=1, . . . , N,i=x,y,z) respectively denote a measured force and moment of a j (th) sensor in the i direction, $p_{ji}$(j=1, . . . , N,i=x,y,z) denotes a position coordinate of the sensor relative to an origin of a coordinate system, and the origin of a coordinate system is set as a projective spot of an ankle located on the foot sole, the ZMP is calculated by the following formula:

$$p_x = \frac{\sum_{j=1}^{N}\{-\tau_{jy} - (p_{jz} - p_z)f_{jx} + p_{jx}f_{jz}\}}{\sum_{j=1}^{N} f_{jz}}$$

$$p_y = \frac{\sum_{j=1}^{N}\{\tau_{jx} - (p_{jz} - p_z)f_{jy} + p_{jy}f_{jz}\}}{\sum_{j=1}^{N} f_{jz}},$$

wherein $P_x$ and $P_y$ are positions of the ZMP in the, y direction.

Step 3: using a centroid compliance controller to calculate a centroid acceleration adjustment variable according to a difference between the actual ZMP position and a desired ZMP position; and integrating the centroid acceleration adjustment variable to obtain a centroid position adjustment variable.

In the embodiment, the centroid compliance controller is designed to calculate the centroid position adjustment variable; the centroid position is adjusted such that the ZMP of the robot can track the desired ZMP thereof, thereby improving the walking stability of the robot. The method is quite effective for a walking humanoid robot with high rigidity.

Figure 3:
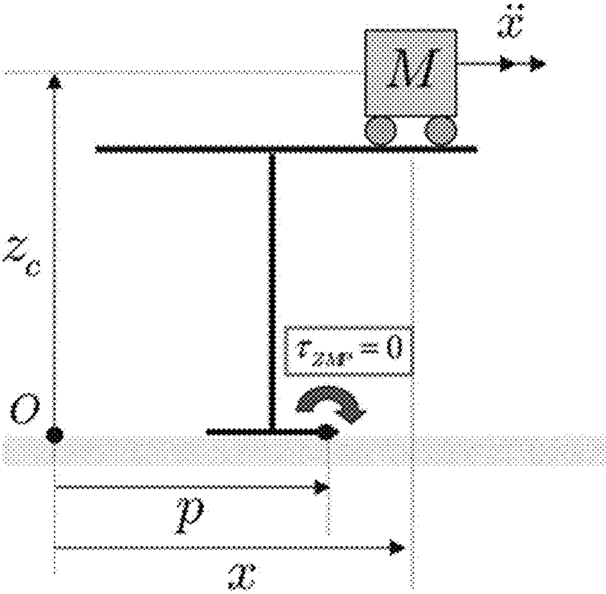
FIG. 3 shows a simplified table-cart model of a biped robot provided in an embodiment of the present invention.

In Step 3, the biped robot is simplified as a table-cart model to design the centroid compliance controller to calculate the centroid position adjustment variable. As shown in FIG. 3, a table height is corresponding to a centroid height relative to the ground; a cart acceleration is a robot centroid acceleration, and the ZMP equation of the table-cart model is as follows:

$$p = x - \frac{z_c}{g}\ddot{x},$$

wherein p denotes a ZMP position of the robot; x denotes a cart position in the x direction; $z_c$ denotes a cart height to ground; and g denotes a gravity acceleration.

In order to detect the actual ZMP position by the sensor, with the time constant (sampling period) T of the sensor being considered, the ZMP equation is given in the following formula, wherein $$\frac{1}{1+sT}$$

denotes a lag phase of a first-order system.

$$p = \frac{1}{1+sT}\left(x - \frac{z_c}{g}\ddot{x}\right).$$

The cart acceleration $\ddot{x}$ is an input variable $u=\ddot{x}$, the state variable of the cart is $X=[p\ x\ \dot{x}]^T$, and the state equation of the system is as follows:

$$\dot{X} = AX + Bu$$

$$A = \begin{bmatrix} -1/T & 1/T & 0 \\ 0 & 0 & 1 \\ 0 & 0 & 0 \end{bmatrix}, B = \begin{bmatrix} -\frac{z_c}{gT} \\ 0 \\ 1 \end{bmatrix}.$$

Similarly, a same table-cart model is established for the ZMP position and the desired cart position, and the state equation thereof is as follows:

$$\dot{X}^d = AX^d + Bu^d,$$

wherein the relationship between the error values of the ZMP position and cart position is as follows:

$$\Delta\dot{X} = A\Delta X + B\Delta u.$$

In order to make the actual value of the ZMP of the robot and the actual value of the centroid position thereof accurately track their respective desired values to maintain the walking stability of the robot, the error values tend to zero with the minimal change in the controlled variable and the state variable, a linear quadratic controller is adopted, and the cost function J is taken as:

$$J = \frac{1}{2}\int\left(\Delta X^T Q \Delta X + R\Delta u^2\right),$$

wherein Q and R respectively denote weights of the state variable and the controlled variable. Coefficients $k_1$, $k_2$ and $k_3$ are calculated by solving the algebraic Riccati equation to obtain the centroid compliance control law:

$$\Delta u = \Delta\ddot{x} = -k_1\Delta p - k_2\Delta x - k_3\Delta\dot{x}.$$

Twice numerical integration is performed for $\Delta\ddot{x}$ by taking T as a discrete unit to obtain the centroid position adjustment variable $\Delta x(k)$ at the moment of k.

$$\Delta\dot{x}(k) = \Delta\dot{x}(k-1) + \Delta\ddot{x}(k)T$$

$$\Delta x(k) = \Delta x(k-1) + \Delta\dot{x}(k)T$$

Step 4: using a double spring-damper model to establish a state equation of a plantar force and a plantar position according to the plantar stress data; and adjusting spring and damper coefficients to calculate a plantar position adjustment variable of the robot in different landing periods in a vertical direction.

In embodiments, the plantar position compliance controller is designed to calculate the plantar position adjustment variable of the robot in different periods in the vertical direction. The plantar position compliance controller is designed to deduce the plantar state equation based on the plantar position compliance control of the double spring-damper model; and the linear quadratic regulator is used to calculate the foot adjustment variable in the vertical direction, thereby reducing the foot impact when the robot lands.

In the landing process, the robot being kept full contact with the ground is the basis of its stable movement. If the robot is affected by external disturbance or uneven ground when walking in a non-ideal condition, the foot stress will deviate from the original planned or predicted trajectory or will cause the early/late landing of the robot, the foot sole will generate relatively great impact, which causes the instability of the robot. In this case, the solution is that compliance control is adopted when the robot contacts with the outside to reduce the influence of the impact on the posture of the robot body.

Figures 4, 5:
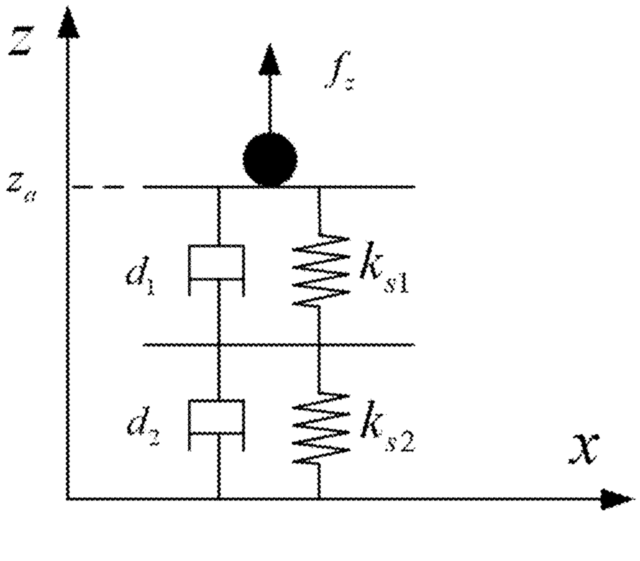
FIG. 4 is a double spring-damper model diagram provided in an embodiment of the present invention.
FIG. 5 is a schematic diagram of a plantar posture compliance controller provided in an embodiment of the present invention.

As shown in FIG. 4, the double spring-damper model consists of two parallel spring-damper units connected in series, $f_z$ denotes an ankle stress in the z axis, $z_a$ denotes the an ankle position in the z direction, and $k_{s1}$, $k_{s2}$ and $d_1$, $d_2$ respectively denote rigidity coefficients and damping coefficients of the two spring-damper units.

The deformation variables of the two spring-damper units are respectively set as $z_1$ and $z_2$, the total deformation variable thereof is $z_a$, the stresses thereof are respectively $f_1$ and $f_2$, and the total stress thereof is $f_z$, the following formulas are satisfied:

$$\begin{cases} z_1 + z_2 = z_a \\ f_1 = f_2 = f_z \\ k_{s1}z_1 + d_1\dot{z}_1 = f_1 \\ k_{s2}z_2 + d_2\dot{z}_2 = f_2 \end{cases}.$$

Laplace transform and arrangement of the above formulas are performed to satisfy:

$$(k_{s1}+k_{s2})f_z + (d_1+d_2)\dot{f}_z = k_{s1}k_{s2}z_a + (k_{s1}d_2 + k_{s2}k_1)\dot{z}_a.$$

If the movement acceleration $\ddot{z}_a$ of the ankle in the z direction is set as the controlled variable $u_z=\ddot{Z}_a$ of the state equation, and $X_z=[f_z\ z_a\ \dot{z}_a]^T$ is used as the state variable of the state equation, the state equations of the above formulas are as follows:

$$\dot{X}_z = AX_z + Bu_z$$

$$A = \begin{bmatrix} -\frac{k_{s1}+k_{s2}}{d_1+d_2} & \frac{k_{s1}k_{s2}}{d_1+d_2} & \frac{k_{s1}d_2+k_{s2}d_1}{d_1+d_2} \\ 0 & 0 & 1 \\ 0 & 0 & 0 \end{bmatrix} B = \begin{bmatrix} \frac{d_1d_2}{d_1+d_2} \\ 0 \\ 1 \end{bmatrix}.$$

The rigidity coefficients and damping coefficients $k_{s1}$, $k_{s2}$ and $d_1$, $d_2$ of the two spring-damper units are modified, such that the robot can exhibit different characteristics in different periods. When the foot lands, the robot body is positioned in the front of the supporting leg, and the swinging leg is about to land; thus, specified compliance is needed to quickly absorb the landing impact of the robot to avoid the instability thereof, while the supporting leg is expected to maintain specified supportability to prevent the robot from rollover due to excessively leaning forward; therefore, for the controller that needs to generate a compliance effect, one of the spring-damper units in the double spring-damper model thereof need to have a relatively large rigidity coefficient and a relatively small damping coefficient and is used to quickly absorb the impact in an initial impact stage; and the other of the spring-damper units in the double spring-damper model thereof needs to have a relatively small rigidity coefficient and a relatively large damping coefficient, and is used to slowly and stably generate a relatively adjustment variable with adaption to the external environment and along with an external force in a later impact stage to realize compliance movement. Therefore, the two spring-damper units exhibit obviously different effects; relationships between the rigidity coefficients and the damping coefficients of the two spring-damper units need to be opposite, that is, one of the spring-damper units has a large rigidity coefficient and a small damping coefficient, and the other thereof has a small rigidity coefficient and a large damping coefficient.

During foot support, swinging legs rise to the sky without external impact and can be configured with any parameters, and supporting legs need to have a specified support strength to prevent feet from bowing forward and leaning backward generated by fitting failure of feet and ground due to excessive compliance. Therefore, for the controller that needs to generate the supporting effect, a relatively small rigidity coefficient and a relatively small damping coefficient are used for one of the spring-damper units in the double spring-damper model thereof to absorb the impact, and a relatively large rigidity coefficient and a relatively large damping coefficient are used for the other of the spring-damper units to generate a relatively small adjustment variable to deal with the external force for specified compliant movement in the later stage. Therefore, the two spring-damper units have same effects and same relationships between the rigidity coefficients and the damping coefficients.

Similarly, a same double spring-damper model is established for the ankle stress in the z axis and the desired ankle position in the z direction, and the state equation thereof is as follows:

$$\dot{X}_z^d = AX_z^d + Bu_z^d.$$

The relationship between the stress of the ankle in the z axis and the desired ankle position and actual ankle position in the z direction can be expressed as:

$$\Delta\dot{X}_z = A\Delta X_z + B\Delta u_z.$$

In order to make the error tend to zero with the minimal change in the controlled variable and the state variable, the linear quadratic controller is adopted, and the cost function J is taken as:

$$J = \frac{1}{2}\int\left(\Delta X_z^T Q\Delta X_z + R\Delta u_z^2\right),$$

wherein Q and R respectively denote weights of the state variable and the controlled variable. A state feedback controller may be expressed as:

$$\Delta u_z = \Delta\ddot{z}_a = -k_{z1}\Delta f_z - k_{z2}\Delta z_a - k_{z3}\Delta\dot{z}_a,$$

wherein $k_{z1}$, $k_{z2}$ and $k_{z3}$ can be obtained by solving the algebraic Riccati equation, $\Delta f_z$, $\Delta z_a$, $\Delta\dot{z}_a$ respectively denotes an ankle stress in the z axis, an ankle position in the z direction, and a difference between the actual and desired ankle speeds in the z direction. Similarly, twice numerical integration is performed for $\Delta\ddot{z}_a$ by taking T as a discrete unit to obtain the plantar position adjustment variable $\Delta z_a(k)$ in the vertical direction at the moment of k.

$$\Delta z_a(k) = \Delta\dot{z}_a(k-1) + \Delta\ddot{z}_a(k)T$$

$$\Delta z_a(k) = \Delta z_a(k-1) + \Delta\dot{z}_a(k)T.$$

Step 5: using a plantar posture compliance controller to calculate a plantar posture adjustment variable according to a difference between a plantar moment and a desired plantar moment.

In the embodiment, the plantar posture compliance controller is designed to calculate the plantar posture adjustment variable. In addition to a fact that the double spring-damper model is used to reduce the plantar impact, it is also necessary to ensure that the foot sole lands flat, avoiding the plantar rollover caused by a rotating moment, thereby causing the instability of the robot. Therefore, the difference between the plantar moment and the desired plantar moment is obtained according to the plantar moment measured in Step 1, to correct a plantar posture (including a rolling direction posture and a pitching direction posture), such that the actual plantar moment can track the desired plantar moment.

The schematic diagram of the plantar posture compliance controller is shown in FIG. 5. The x direction is taken as an example, it is assumed that an included angle between the foot sole and the ground is δ in a case that the plantar moment is τ, the plantar posture is adjusted according to the following control law:

$$k_d\Delta\dot{\delta}_i + k_p\Delta\delta_i = \tau_i^d - \tau_i (i = L, R),$$

wherein $\tau_i$ and $$\tau_i^d$$

respectively denote the plantar moment of the i (th) foot and the desired plantar moment thereof at the ZMP; i=L,R respectively denote left foot and right foot; denotes the plantar posture of the i (th) foot to be adjusted, wherein the plantar posture includes the rolling direction posture and the pitching direction posture; $k_P$ and $k_d$ denote gain parameters to be adjusted.

wherein the desired plantar moment $$\tau_i^d$$

is calculated according to the following formula:

$$\tau_i^d = (p_i - p_{zmp}^d) \times f_i^d (i = L, R),$$

wherein $$p_{zmp}^d$$

denotes the desired ZMP position, $p_i$ denotes the foothold of the i(th) foot, and $$f_i^d$$

denotes the desired plantar stress of the i(th) foot. When such a leg is the swinging leg, the desired plantar stress thereof is zero. When such a leg is the supporting leg, the desired plantar stress thereof is the gravity of the robot.

The moments of four points, measured by the sensor, are converted to a foothold moment to calculate the actual moment.

Step 6: respectively superimposing the adjustment variables of the centroid position, plantar position and plantar posture to the originally desired centroid position, plantar position and plantar posture; and obtaining angle information of various joints adjusted through an inverse kinematics solution to drive the robot to walk forward.

In the embodiment, the originally desired centroid position, plantar position and plantar posture are generated according to a three-dimensional linear inverted pendulum model; the correction variables of the centroid position, plantar position and plantar posture are superimposed into the desired gait value originally generated to obtain a correction value; a leg joint angle $q_d$ capable of realizing a compliant and stable adjustment function is calculated through an inverse kinematics solution; and the balance between the centroid and the foot is adjusted, thereby increasing the stability of the fast walking biped robot.

According to a whole-body compliance control method applied to a fast and stable walking biped robot provided in an embodiment, the plantar position compliance controller is used to reduce the landing impact and ensure the supportability thereof during support; the plantar posture compliance controller is used to ensure that the actual plantar moment of the robot can track the desired plantar moment to correct the plantar posture and prevent the robot from rollover; and the centroid compliance controller is used to adjust the centroid position, such that the actual centroid position can track the desired centroid position when the robot fast walks, thereby adjusting the ZMP position and increasing the stability of the fast walking biped robot.

The technical solutions and beneficial effects of the present invention are elaborated in the foregoing embodiments. It should be understood that the foregoing embodiments are merely the most preferred embodiments of the present invention, and are not intended to limit the present invention. Any modification, supplement, and equivalent replacement, etc. made within the principle of the present invention should fall within the protection scope of the present invention.

What is claimed is:

1. A whole-body compliance control method applied to a fast and stable walking biped robot, comprising the following steps:

Step 1: acquiring plantar stress data according to information of a foot force sensor, wherein the plantar stress data includes a plantar stress and a plantar moment;

Step 2: calculating an actual zero moment point (ZMP) position of the robot according to the plantar stress data;

Step 3: using a centroid compliance controller to calculate a centroid acceleration adjustment variable according to a difference between the actual ZMP position and a desired ZMP position;

and integrating the centroid acceleration adjustment variable to obtain a centroid position adjustment variable;

Step 4: using a double spring-damper model to establish a state equation of a plantar force and a plantar position according to the plantar stress data; and adjusting spring and damper coefficients to calculate a plantar position adjustment variable of the robot in different landing periods in a vertical direction; wherein the double spring-damper model comprises two spring-damper units, the rigidity coefficients and damping coefficients of the two spring-damper units are selected according to different characteristics of the foot sole of the robot in different periods; when the foot sole just lands, relationships between the rigidity coefficients and the damping coefficients of the two spring-damper units need to be opposite, that is, one of the spring-damper units has a large rigidity coefficient and a small damping coefficient, and the other thereof has a small rigidity coefficient and a large damping coefficient; during foot support, the two spring-damper units have same effects and same relationships between the rigidity coefficients and the damping coefficients;

Step 5: using a plantar posture compliance controller to calculate a plantar posture adjustment variable according to a difference between the plantar moment and a desired plantar moment, wherein the plantar posture includes a rolling direction posture and a pitching direction posture; and the plantar posture adjustment variable is calculated by the plantar posture compliance controller according to the following formula:

$$k_d\dot{\delta} + k_p\delta = \tau^d - \tau,$$

wherein $\tau$ and $\tau^d$ respectively denote the plantar moment and the desired plantar moment; $\delta$ denotes the plantar posture to be adjusted, wherein the plantar posture comprises the rolling direction posture and the pitching direction posture; and $k_p$ and $k_d$ denote gain parameters to be adjusted;

Step 6: respectively superimposing the adjustment variables of the centroid position, plantar position and plantar posture to the originally desired centroid position, plantar position and plantar posture; and obtaining angle information of various joints adjusted through an inverse kinematics solution to drive the robot to walk forward;

wherein sensor information is collected by a moment sensor array or a force sensor array that is uniformly distributed on a foot sole;

wherein in the Step 2, according to the plantar stress data, the actual ZMP positions of the robot in x and y directions are calculated through the following formula:

$$p_x = \frac{\sum_{j=1}^{N}\{-\tau_{jx} - (p_{jz} - p_z)f_{jy} + p_{jy}f_{jz}\}}{\sum_{j=1}^{N} f_{jz}}$$

$$p_y = \frac{\sum_{j=1}^{N}\{\tau_{jy} - (p_{jz} - p_z)f_{jx} + p_{jx}f_{jz}\}}{\sum_{j=1}^{N} f_{jz}},$$

wherein $f_{ji}$ and $\tau_{ji}$ respectively denote a measured force and moment of a j (th) sensor in the i direction, $p_{ji}$ denotes a position coordinate of the sensor relative to an origin of a coordinate system, j=1, . . . , N,i=x,y, and the origin of a coordinate system is set as a projective spot of an ankle located on the foot sole;

wherein in the Step 3, the biped robot is simplified as a table-cart model to design the centroid compliance controller, wherein a table height is corresponding to a centroid height relative to the ground; a cart acceleration is a robot centroid acceleration, and the centroid compliance controller is used to calculate the centroid position adjustment variable; and such calculation comprises:

firstly, calculating the centroid acceleration adjustment variable:

$$\Delta\ddot{x} = -k_1\Delta p - k_2\Delta x - k_3\Delta\dot{x},$$

wherein Δp denotes the difference between the desired ZMP position of the robot and the actual ZMP position thereof; Δx, $\Delta\dot{x}$ and $\Delta\ddot{x}$ respectively denote cart position, velocity and acceleration adjustment variables; $k_1$, $k_2$ and $k_3$ are determined by coefficient matrices $$\begin{bmatrix} -1/T & 1/T & 0 \\ 0 & 0 & 1 \\ 0 & 0 & 0 \end{bmatrix}$$

and $$\begin{bmatrix} -\frac{z_c}{gT} \\ 0 \\ 1 \end{bmatrix}$$

and weight matrices Q and R of a state variable and a control variable, T denotes a sampling period of a sensor, $z_c$ denotes a table height to ground, and g denotes a gravity acceleration;

secondly, performing twice numerical integration on $\Delta\ddot{x}$ to obtain the centroid position adjustment variable;

wherein a linear quadratic regulator is used to calculate coefficients $k_1$, $k_2$ and $k_3$;

wherein in the Step 4, the double spring-damper model is expressed as:

$$(k_{s1} + k_{s2})f_z + (d_1 + d_2)\dot{f}_z = k_{s1}k_{s2}z_a + (k_{s1}d_2 + k_{s2}d_1)\dot{z}_a$$

wherein $f_z$ denotes an ankle stress in the z axis, $z_a$ denotes an ankle position in the z direction, and $k_{s1}$, $k_{s2}$ and $d_1$, $d_2$ respectively denote rigidity coefficients and damping coefficients of two spring-damper units;

the double spring-damper model is transformed into the form of the state equation, and the linear quadratic regulator is used to calculate the acceleration adjustment variable of the foot sole in a vertical direction:

$$\Delta\ddot{z}_a = -k_{z1}\Delta f_z - k_{z2}\Delta z_a - k_{z3}\Delta\dot{z}_a,$$

wherein $\Delta f_z$ denotes a difference between a desired stress value of the ankle and an actual stress value thereof along the z axis, $\Delta z_a$, $\Delta\dot{z}_a$ and $\Delta\ddot{z}_a$ respectively denote the position, velocity and acceleration adjustment variables of the ankle in the z direction, $k_{z1}$, $k_{z2}$ and $k_{z3}$ are determined by coefficient matrices $$\begin{bmatrix} -\frac{k_{s1}+k_{s2}}{d_1+d_2} & \frac{k_{s1}k_{s2}}{d_1+d_2} & \frac{k_{s1}d_2+k_{s2}d_1}{d_1+d_2} \\ 0 & 0 & 1 \\ 0 & 0 & 0 \end{bmatrix}$$

and $$\begin{bmatrix} \frac{d_1d_2}{d_1+d_2} \\ 0 \\ 1 \end{bmatrix}$$

and weight matrices Q and R of a state variable and a control variable, and $k_{s1}$, $k_{s2}$ and $d_1$, $d_2$ respectively denote rigidity coefficients and damping coefficients of the two spring-damper units; and wherein a linear quadratic regulator is used to calculate coefficients $k_{z1}$, $k_{z2}$ and $k_{z3}'$.

2. The whole-body compliance control method applied to a fast and stable walking biped robot according to claim 1, wherein in Step 6, the originally desired centroid position, plantar position and plantar posture are generated by a three-dimensional linear inverted pendulum model.

* * * * *